United States Patent Office 3,233,689
Patented Feb. 8, 1966

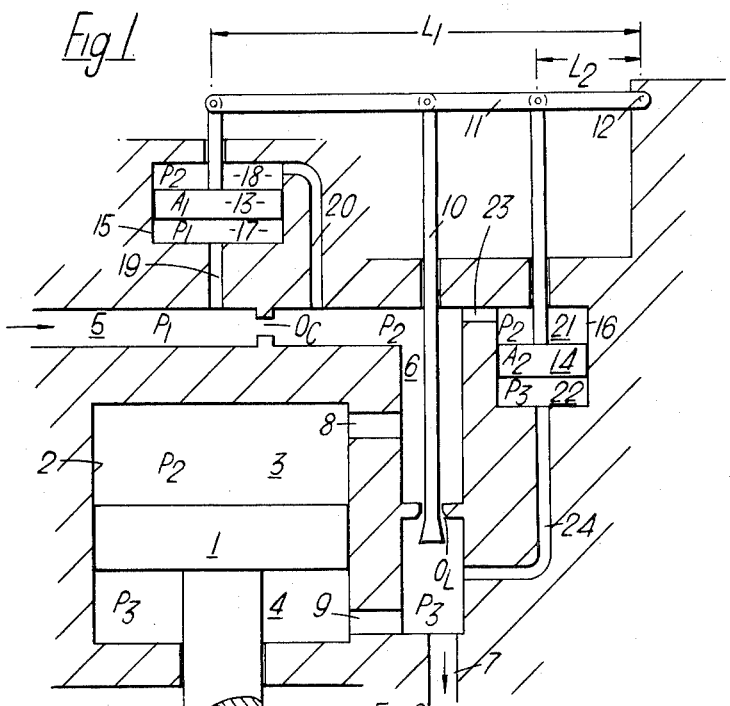

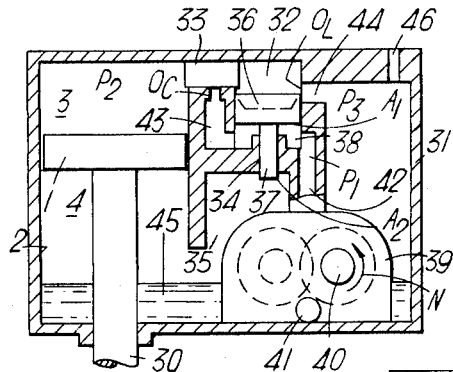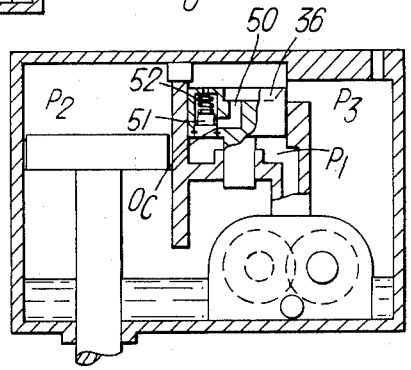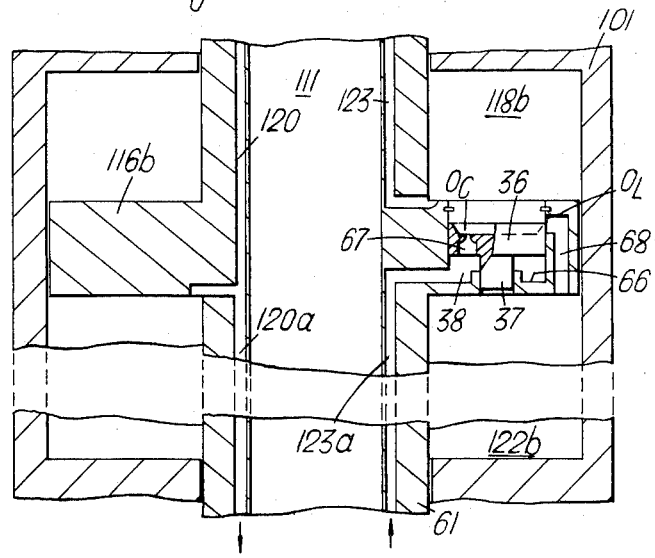

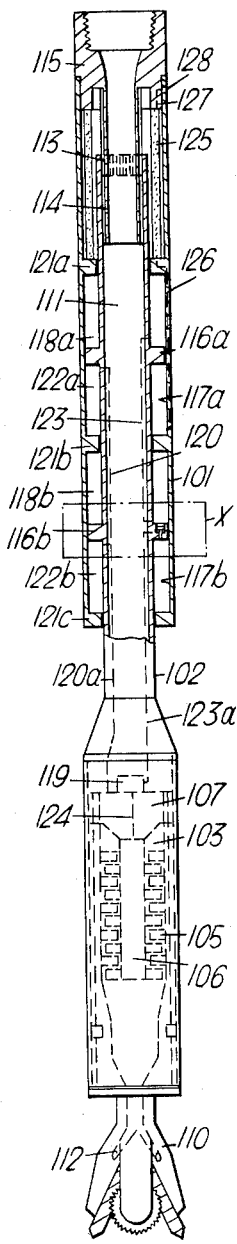

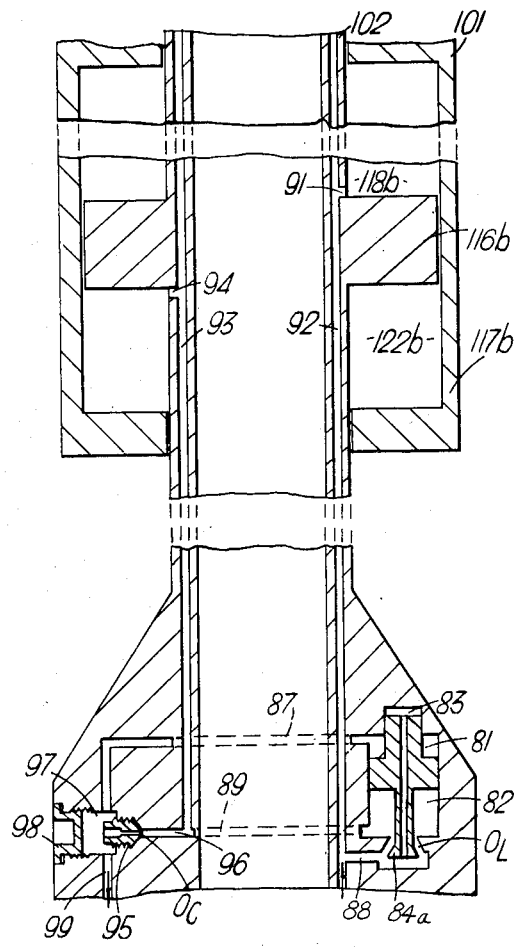

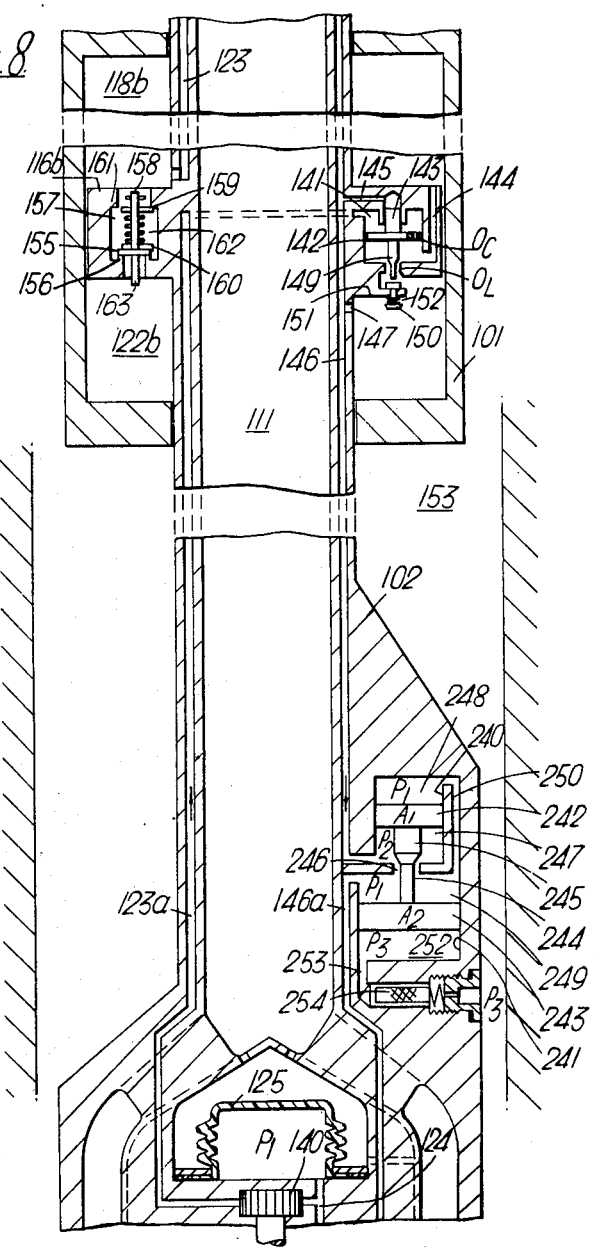

3,233,689
FLUID PRESSURE MOTIVE SYSTEMS, PRIMARILY FOR BOREHOLE DRILLING
Frank Whittle, Walland Hill, Chagford, Devonshire, England
Filed Nov. 29, 1962, Ser. No. 240,852
Claims priority, application Great Britain, Nov. 30, 1961, 42,901/61, 42,902/61
10 Claims. (Cl. 175—94)

This invention relates to fluid pressure motive systems adapted to operate with a continuous flow of working fluid and to produce an output force which is a function of the rate of supply of the working fluid.

With the known systems in which the pressure drop across a fixed orifice in a fluid flow path is applied across a motive piston, the instantaneous value of the output force is not a function only of the rate of supply of the working fluid, but is a function also of the speed of movement of the motive piston relative to its cylinder. This is because the rate of flow of fluid through the orifice is the difference or sum of the rate of supply, and the rate at which fluid, owing to movement of the motive piston, enters or leaves the upstream side of the motive cylinder and leaves or enters the downstream side. Hence the rate of movement of the piston affects the pressure difference acting on the piston.

A system according to the invention comprises a flow path for a working fluid, two orifices in series in the flow path, a motive piston and cylinder or its equivalent connected to the flow path so that the piston will be subjected to the pressure drop across one only of the orifices, and means for varying the area of the last-mentioned orifice to maintain the pressure drop across the two orifices directly proportional to one another.

In this system only the flow through the last-mentioned orifice, conveniently termed the "loading orifice," is subject to variations with the speed of the motive piston relative to its cylinder. The flow through the other orifice, conveniently termed the "control orifice," is always equal to the rate of flow of the working fluid, and the pressure drop across the control orifice is therefore (unless a further factor is deliberately introduced) a function only of that rate. Since the pressure drop across the loading orifice is held proportional to that across the control orifice, the output force can be independent of relative piston speed.

If the control orifice is of fixed area, the output force will vary as the second power (square) of the rate of supply of working fluid. However, means may be provided for varying the area of the control orifice either as a function of the pressure upstream of the control orifice, so as to obtain variation of output force from the piston according to a different power of the rate of supply of the working fluid, or in dependence upon some other factor or factors. Where it is desired to effect control in dependence upon more than one factor it may be convenient to divide the control orifice into a corresponding number of orifices arranged in series or in parallel.

The means for varying the area of the loading orifice may comprise a valve member connected to two pistons or their equivalent acting in opposition, one piston being subject to the pressure drop across the control orifice and the other to the pressure drop across the loading orifice.

Where the system comprises a motive piston having a piston rod (through which the output force is applied) emerging into a region subject to pressure variations relatively to a pressure effective within the system, a further error in the output force is caused. This error may be important, especially in cases where, to provide adequate rigidity, the piston rod has to have a relatively large cross sectional area where it emerges, and there is a large difference between the inside and outside pressures effective on this area (which will be called "the emergence area").

According to a feature of this invention, means are provided for controlling the pressure of working fluid acting in the system reversely to the output force, to maintain the said reverse pressure at a value proportional to the difference between the pressures inside and outside the system which are effective on the emergence area. By suitable choice of the factor of proportionality, in relation to the ratio of the emergence area to the area upon which the reverse pressure is effective, the above-mentioned error may be eliminated or reduced to a desired extent.

The invention is applicable, for example, to feed devices for rotary drills in which it is desired to maintain a selected relationship between the rotational speed of the drill and the feed force applied to it, independently of the rate of advance of the drill. In particular, the invention may be applied to a borehole drilling unit for connection to the lower end of a drill string including a tensioning collar assembly, the unit comprising a motor having an output shaft for connection to a rotary drill bit. For this purpose a system according to the third paragraph of this specification, with or without any of the features described thereafter, is arranged for advancing the motor relatively to the collar assembly, and there is a positive displacement pump in fixed-ratio driving connection with the motor, for circulation of a working liquid through the system.

The invention is illustrated by the accompanying drawings in which:

FIGURE 1 illustrates the principle of the invention;

FIGURE 2 shows a simplified construction with a fixed-area control orifice;

FIGURE 3 shows a modified arrangement with a variable-area control orifice;

FIGURE 4 shows a borehole drilling unit embodying the invention;

FIGURE 5 is an enlargement of the part of FIGURE 4 enclosed in the chain line box X;

FIGURES 6 and 7 show two alternative ways of embodying the invention in a borehole drilling unit; and FIGURE 8 shows a fourth alternative embodiment, together with means for correcting errors arising from differential pressures acting on the emergence area of the system.

The system illustrated in FIGURE 1 comprises a motive piston 1 operating in a cylinder 2 so as to form upper and lower working chambers 3 and 4 respectively. Working fluid under pressure is supplied through a passage 5 containing a fixed area "control" orifice $O_C$ to a passage 6 containing a variable area "loading" orifice $O_L$, and returns to the low-pressure side of the system through a passage 7. The passages 5, 6 and 7 together constitute the "flow path" referred to in the third paragraph of this specification. Working fluid is admitted to the cylinder chambers 3 and 4 through passages 8 and 9 branching from the passage 6 upstream and downstream of the orifice $O_L$ respectively, so that the pressure drop across the orifice $O_L$ is effective on the motive piston 1 to produce an output force proportional to the said pressure drop.

If $O_L$ were a fixed-area orifice, the output force from the motive piston 1 would be a function of the piston speed as well as of the rate of supply of working fluid through the passage 5, since the flow through the orifice $O_L$ is equal to the rate of supply plus or minus the flow out of or into the cylinder chamber 3. The flow through the control orifice $O_C$ is, however, not affected by this plus and minus variation. Consequently the desired result of keeping the output force a function only of the rate of fluid supply through the passage 5 can be achieved by varying the area of the orifice $O_L$ in such a way that the pressure drop across it is always directly proportional to the pressure drop across the control orifice $O_C$.

For this purpose, a valve needle 10 controlling the area of the orifice $O_L$ is connected to a balance lever 11 pivoted to fixed structure at 12 and also connected to two pistons 13 and 14 operating in cylinders 15 and 16 respectively. The piston 13 divides the cylinder 15 into lower and upper working chambers 17 and 18 which are connected by passages 19 and 20 to the passage 5 upstream and downstream of the orifice $O_C$ so that the pressure drop is effective on the piston 13 in the sense to decrease the area of the orifice $O_L$. Similarly, the piston 14 divides the cylinder 16 into upper and lower working chambers 21 and 22 which are connected by passages 23 and 24 to the passage 6 upstream and downstream of the orifice $O_L$, so that the pressure drop is effective on the piston 14 in the direction to increase the area of the orifice $O_L$, i.e. in opposition to the piston 13.

Using the following notation:

$P_1$=the supply pressure upstream of orifice $O_C$ and in the chamber 17,
$P_2$=the pressure downstream of orifice $O_C$ and in the chambers 3, 18 and 21,
$P_3$=the the pressure downstream of orifice $O_L$ and in the chambers 4 and 22,
$A_1$=the area of the piston 13,
$A_2$=the area of the piston 14,
$L_1$=the lever arm of the piston 13,
$L_2$=the lever arm of the piston 14, Then, neglecting the small areas of the piston rods and of the valve needle 10, balance is attained when:

$$(P_1-P_2)A_1L_1 = (P_2-P_3)A_2L_2$$

whence $$P_2-P_3 = (P_1-P_2)\frac{A_1L_1}{A_2L_2}$$

since $A_1$, $A_2$, $L_1$ and $L_2$ are all constant, it follows that $P_2-P_3$, which is the pressure drop effective across the motive piston 1, is directly proportional to $P_1-P_2$, which is the pressure drop across the control orifice $O_C$ and is independent of the speed of the motive piston 1. If conditions change in such a way that the balance is disturbed, the pistons 13 and 14 and the valve needle move in whichever direction will tend to restore the balance. For example, if the downward speed of the motive piston decreases, while the rate of fluid supply remains unchanged, the quantity $P_2-P_3$ will rise, and the needle 10 will move downwards to open the orifice. The maximum downward speed of the motive piston is of course determined by the maximum rate of supply of working fluid through the passage 5, with the orifice $O_L$ closed. The system continues to work even if the motive piston 1 is displaced upwards by external action on the piston rod, against the direction of the output force.

The device may be simplified mechanically by using a differential piston in place of the two separate pistons 13 and 14 connected by the balance lever 11. This is illustrated in FIGURE 2 in which a motive piston 1 operates in a cylinder 2 with working chambers 3 and 4. The force developed on the piston is transmitted through a piston rod 30 to its point of application, there being of course an equal and opposite reaction on a casing 31 containing the cylinder 2 and other parts of the system. The casing 31 includes a stepped cylinder communicating at its larger diameter end 32 with the working chamber 3 by way of a passage 33 and at its smaller diameter end 34 with a space 35 in communication with the working chamber 4. A differential piston having a larger diameter part 36 and a smaller diameter part 37 operates in the stepped cylinder and defines with the step a working chamber 38. A gear pump 39 mounted in the casing 31 and having a driving shaft 40 draws working liquid through an inlet port 41 and discharges it through a passage 42 into the chamber 38, whence it passes through a passage 43, a fixed area control orifice $O_C$ and the passage 33 into the working chamber 3. Liquid from the passage 33 also returns to the low pressure side of the system through a passage 44 which opens into the cylinder end 32 at a position such that the larger diameter part 36 of the differential piston controls the opening in a manner constituting a variable area loading orifice $O_L$. The casing 31 is shown partly filled with working liquid 45 and vented to the atmosphere at 46, but it can equally well be completely filled with a liquid or gas, the interior being separated from fluid surrounding the casing by a flexible diaphragm or other means permitting transfer of pressure.

It will be seen that, just as in the arrangement shown in FIGURE 1, the orifice $O_C$ passes the whole of the flow from the pump 39 all the time, while the orifice $O_L$ passes this flow plus or minus the flow out of or into the working chamber 3.

Using the same notation as in FIGURE 1, except that $A_1$ is now the area of the piston step and $A_2$ is the area of the part 37 of the piston, $$(P_1-P_2)A_1 = (P_2-P_3)A_2$$

whence $$P_2-P_3 = (P_1-P_2)\frac{A_1}{A_2}$$

The practical result is thus the same as with the arrangement shown in FIGURE 1 although the lever arm terms have been eliminated. Since the control orifice $O_C$ has a fixed area, and the pump 39 is of the positive displacement type, the pressure drop across $O_C$ is proportional to the square of the speed N of the pump driving shaft 40. Consequently the pressure drop across the loading orifice $O_L$, and the force developed by the motive piston 1, are also proportional to $N^2$.

This square law relation can be modified by replacing the fixed orifice $O_C$ by an orifice, the aera of which varies with the pressure drop across that orifice, according to a selected law. FIGURE 3 shows a modification of this kind, the device being similar to that shown in FIGURE 2, except that the passage 43 and orifice $O_C$ are replaced by a passage 50 extending through the larger-diameter part 36 of the differential piston, and having an opening $O_C$, the area of which is controlled by a valve piston 51 which is a sliding fit in a bore in the differential piston. The lower end of the bore is open and thus the lower end of the valve piston is subjected to the pressure $P_1$. The upper end of the bore is also open, but is contracted to provide a shoulder, and a compression spring 52 is confined between the shoulder and the valve piston 51. Thus the upper end of the valve piston is subjected to the pressure $P_2$ and to the force of the spring. The side of the valve piston overlaps the opening $O_C$, and thus the area available for flow depends upon the position of the valve piston, which in turn is determined by the difference between $P_1$ and $P_2$ and by the rate of the spring 52. With the arrangement shown, the area of the opening increases with increase of pressure drop across the opening, so that, by suitable selection of the profile of the opening any desired law can be obtained of the form $P_1-P_2=KN^x$, where $x$ is less than two. By reversing the arrangement, so that the area of the opening decreases with increase of pressure drop across the opening, laws of the same form with $x$ greater than two can be obtained.

The invention is particularly applicable to borehole drilling equipment of the kind described in United States Patent No. 2,937,007 with reference to FIGURE 9B thereof. This equipment includes a motor (which may be an electric motor, or a hydraulic turbine operated by drilling mud pumped down through a hollow drill string) with an output shaft for connection to a rotary drill bit, and a hydraulic ram device interposed between the motor and a heavy collar assembly which maintains the drill string, extending down through the borehole to the collar assembly, in tension. The ram device serves to regulate the axial loading on the bit, known as the "bit weight," and is supplied with oil by a positive-displacement pump driven by the drilling motor. For a given bit weight, the torque required to rotate the drill bit decreases with increase in hardness of the formation being drilled, and there is therefore a tendency for the speed to increase. High speeds in hard formation are, however, detrimental to the life of the drill bit, and may also cause damage to or premature wear of the turbine, and the above-mentioned patent proposes various ways in which such speeds may be avoided by controlling bit weight in relation to speed, by means of the ram device. The control exercised in this way is, however, subject to error if the pay-off rate of the drill string, i.e. the rate at which the drill string is lowered into the borehole, differs from the rate of penetration of the bit. By constructing the ram and its pump in accordance with the present invention this source of error can be substantially eliminated.

One way of doing this is illustrated in FIGURES 4 and 5. In FIGURE 4 the outer member 101 of a hydraulic ram is arranged for connection at its upper end to a drill string (not shown) and the inner member 102 is connected at its lower end to a hydraulic turbine 103, of any suitable type, but preferably having contra-rotating rotors 105 and 106 interconnected by a gearbox 107 as described in United States Patent No. 2,937,008.

The turbine is operated by drilling mud, which is pumped down to it through the drill string and through a passage 111 through the inner member of the ram. After passing through the turbine, the mud enters the drill bit 110 and issues through discharge openings 112. The torque reaction of the turbine is transmitted to the drill string through an internally-splined portion 113 at the upper end of the inner member 102, which engages an externally-splined sleeve 114 projecting into the passage 111 from an end fitting 115 attached to the outer member 101.

The ram comprises upper and lower annular bit-loading pistons 116a and 116b, carried by the inner member 102 and operating in cylinders 117a, 117b formed in the outer member 101. The ends walls of these cylinders are formed by abutment members 121a, 121b, 121c, carried by the outer member 101. The cylinder space 118a above the piston 116a is connected to the cylinder space 118b above the piston 116b by a passage 123 formed in the wall of the inner member 102, and a similar passage 120 connects the cylinder space 122a below the piston 116a to the cylinder space 122b below the piston 116b. The pistons 116a and 116b thus operate in tandem.

The chamber 122b below the lower piston is connected by an extension 120a of the passage 120 to the lubrication passage system of the gearbox 107. A gear pump 119, mounted on and driven from the gearbox, draws the oil from a lower part of the gearbox through a pipe 124 and delivers it through a passage 123a to a working chamber 38 (FIGURE 5). This chamber 38 is formed between a differential piston 36, 37 mounted in a stepped bore extending through the piston 116b, and the step 66 of the bore. The larger diameter end 36 of the differential piston is exposed to the pressure in the ram chamber 118b, while the smaller diameter end 37 is exposed to the pressure in the chamber 122b on the other side of the motive piston 116b. A passage 67 with a fixed area control orifice $O_C$ is provided in the piston 36, for flow of oil from the chamber 38 into the chamber 118b, while a passage 68 formed in the piston 116b has an opening $O_L$ into the chamber 122b, and the area of this opening $O_L$ is controlled by the upper edge of the piston 36.

The device operates similarly to FIGURE 2, that is to say, if the pay-off rate of the outer member 101 exceeds the rate of penetration of the drill bit, the pressure difference across the pistons 116a and 116b is prevented from rising out of proportion with that across the orifice $O_C$, by the differential piston 36, 37 moving downwards, and thus increasing the area of the orifice $O_L$. Conversely, if the pay-off rate is lower than the rate of penetration of the drill bit, the differential piston 36, 37 moves upwards, and thus reduces the area of the orifices $O_L$.

In cases where the radial width of the motive piston 116b is too small to accommodate a differential piston control device with sufficiently large piston and orifice areas, the piston may be provided with more than one differential piston control device. Alternatively, or in addition, where, as in this example, the ram device includes more than one motive piston, each motive piston may have its own one or more differential piston control devices, in which case the cylinder chambers 118a and 118b are connected in parallel instead of in series as described.

A reserve of oil is carried in a flexible container 125 which is housed at the upper end of the ram in a space outside the splined torque transmission sleeve 114. The container is exposed externally to the pressure of the drilling mud in the passage 111 and is connected by a conduit 126 formed in the outer member 101 to the cylinder space 122a below the motive piston 116a. A further conduit 127 leads from the top of the container to an injection nipple 128 which is normally protected by a suitable cap and permits the system to be recharged with oil.

FIGURE 6 shows a modification in which the differential piston and the control orifice are arranged in one of the abutment members 121b carried by the outer member 101 of the ram so that the control orifice is easily accessible for exchange or adjustment to alter its cross-sectional area, such facility being desirable to adapt the equipment for use with drilling mud compositions of different viscosities, or densities, or with alternative types of drilling bit requiring different relationships between bit weight and speed of rotation of the bit.

In this case the inner member 102 of the ram is connected at its upper end to the drill string and the outer member 101 is connected at its lower end to the drilling motor. Oil from a positive-displacement pump, driven by the drilling motor, flows at pressure $P_1$ up through a passage 73 formed in the outer member 101, into a recess 74, which is accessible from outside the ram by removing a screw-threaded plug 75. An exchangeable plug 76, screw-threaded into a bore extending from the recess into a passage 77 leading to a motive cylinder chamber 118b below the abutment 121b carries the control orifice $O_C$, so that oil is discharged into the chamber 118b at pressure $P_2$ and urges a motive piston 116b carried by the inner member 102 downwards. A second motive piston 116a on the inner member defines the upper end of a working chamber 122a above the abutment member 121b, this chamber being connected by a passage 78 in the outer member to the low-pressure side of the pump. The abutment member 121b is also formed with a differential cylinder, housing a differential piston having a larger-diameter part 79 and a smaller-diameter part 80. The step of the piston defines a chamber 81, the larger-diameter part defines a chamber 82, and the smaller-diameter part defines a chamber 83. The differential piston also carries a valve needle 84, projecting from the larger-diameter end of the piston, and cooperating with a loading orifice $O_L$ which connects the chamber 82 with the chamber 122a. A passage 85 connects the passage 77 (on the downstream side of the control orifice $O_C$) with the chamber 82, so that oil at pressure $P_2$ can flow through the orifice $O_L$ and establish pressure $P_3$ in the working chamber 122a. A pressure $P_3'$, substantially equal to the pressure $P_3$, is also conveyed to the chamber 83 below the differential piston by a passage 86 extending axially through the latter, while the pressure $P_1$ is conveyed to the step chamber 81 through a passage 87. Although, for convenience in illustration, the orifice $O_C$ and the differential piston are shown in diametrically opposite positions in the abutment 121b, it will be appreciated that they can in fact be arranged close together.

Neglecting the small effect of the pressure $P_3$ acting on the area of the valve needle 84, this arrangement operates in the same way as those previously described, that is to say the control orifice $O_C$ passes all the flow from the pump all the time, while the loading orifice $O_L$ passes this flow plus or minus the flow out of or into the working chamber 118b. Furthermore, the pressure drop across the control orifice $O_C$ is effective on the step area of the differential piston, in opposition to the loading on the small-diameter area of the piston, produced by the pressure drop across the loading orifice $O_L$.

FIGURE 7 shows a further modification, in which the inner member 102 is again connected to the drilling motor, and the control elements are housed adjacent to the motor. The inner member 102 carries a plurality of motive pistons 116, only one of which 116b is shown, operating in cylinders 117 formed in the outer member 101, which is attached at its upper end, not shown, to the drill string. All the upper cylinder chambers 118 are connected by ports 91 to an oil supply passage 92, which extends down through the inner member 102 to the delivery outlet of a pump (not shown), driven by the drilling motor. A similar return flow passage 93 is connected by ports 94 to the lower cylinder chambers 122, and leads to the upstream side of a control orifice $O_C$, formed in a plug 95. This plug 95 is screwed into a bore 96 leading from a recess 97 formed in an enlarged part of the inner member 102 adjacent to the motor, the mouth of the recess 97 being closed by a removable plug 98. A passage 99 returns the oil to the pump. A differential piston device resembling that described with reference to FIGURE 6 is housed in the inner member 102 adjacent to the recess 97, but for convenience of illustration is shown in a diametrically opposite position. The step chamber 81 of this device is connected to the recess 97 by a passage 87, the larger-diameter chamber 82 is connected to the return flow passage 93, upstream of the orifice $O_C$, by a passage 89, and the orifice $O_L$ is connected to the supply passage 92 by a passage 88. Operationally the system only differs from that shown in FIGURE 6 in that the direction of flow of oil is reversed, the control orifice $O_C$ being in the return flow passage instead of in the supply passage and the direction of taper of the valve needle 84a being reversed. By repositioning the ports 91 to connect the passage 92 to the lower chambers 122, and the ports 94 to connect the upper chambers 118 to the passage 93, and reversing the taper of the valve needle, the system could be converted for use with the passage 93 as the supply passage and the passage 92 as the return-flow passage.

In the arrangement shown in FIGURE 8, the outer member 101 of the ram is again connected to the drill string, and the inner member 102 to a turbine of the kind shown in FIGURE 4, one of the gears of a gear pump for operating the ram being shown at 140. A passage 123a carries oil from the delivery port of the pump to a working chamber 141, formed between a differential piston 142, 143, mounted in the piston 116b, and the step of its corresponding cylinder. The larger-diameter end 142 of the differential piston is exposed to the pressure in the ram chamber 118b by way of a passage 144, while the smaller-diameter end 143 is exposed to the pressure in the chamber 122b by way of a passage 145 leading to a return-flow passage 146, which communicates with the chamber 122b through a port 147, and similarly with a chamber below an upper motive piston, not shown. A chamber above the upper motive piston is connected to the chamber 118b by a passage 123, so that both motive pistons operate in tandem as previously described. It is not, however, always necessary to provide more than one motive piston. A fixed area control orifice $O_C$ is provided in the piston 142 for flow of oil from the chamber 141 into the chamber 118b by way of the passage 144. The piston 142 carries a valve needle 149 controlling the area of a loading orifice $O_L$ connecting the chambers 122b and 118b. The device operates in the manner previously described, but in addition is provided with means for opening the orifice $O_L$ should the piston 116b approach the bottom end of its travel with the orifice $O_L$ closed. This condition might occur if the pay-off rate of the drill string were so much too slow that the full capacity of the gear pump was required to cause the ram to follow up the advance of the drill bit. Such a condition would result in a severe hydraulic shock in the system when the ram arrived at the end of its stroke. To avoid this, a tappet 150 is mounted below and in alignment with the valve needle 149, in a bracket-like projection 151 below the piston 116b. The tappet is normally held in its lowermost position by a light spring 152, but, when the piston is approaching the end of its cylinder space 122b, the tappet is stopped by engagement with the end of the space, and continued movement of the piston raises the valve needle 149 off its seat, so that oil can escape through the orifice $O_L$ and the port 147, back to the low-pressure side of the system.

The ram is preferably also provided with a one-way release valve, the function of which is to prevent the pressure below the motive piston from exceeding that above it to any appreciable extent, as otherwise might happen if the assembly were lifted rapidly off the bottom of the borehole with the ram not fully extended, the dead weight of the piston and drill parts attached to it then increasing the pressure of the return oil until the ram became fully extended. In FIGURE 8 a one-way valve is arranged in the piston 116b. The valve comprises a head portion 155, engaging a seat 156 in a chamber 157 extending through the piston, and a stem portion 158 guided in upper and lower star-shaped washers 159, 160, the upper washer 159 seating against a shoulder 161 in the chamber 157 and a light spring 162 being interposed between the washers to keep the valve normally seated. With the valve arranged in this position, it can be provided with a downward extension 163 to engage the end wall of the cylinder space 122b and perform the function of the tappet 150, the latter then being omitted.

To provide adequate structural stiffness, and a mud-flow passage 111 of sufficient cross-sectional area, the inner member 102 of the ram has to be of substantial cross-sectional area where it emerges from the outer member 101 into the borehole 153. The extension force of the ram therefore includes a component due to the difference between the pressures of the drilling mud in the mud-flow passage 111 and in the borehole 153 surrounding the ram, this difference being effective on the emergence area of the ram. At this pressure difference may be of the order of 500 to 1,000 pounds per square inch, and it is little affected by the speed of the turbine, whereas the extension force produced by operation of the gear pump 140 varies very rapidly with the speed of the turbine, it will be seen that this pressure difference can cause a substantial modification of the law relating bit weight to bit speed.

To enable this component of the extension force to be eliminated, or reduced to a tolerable value, means are provided for controlling the pressure of the oil acting on the undersides of the bit-loading motive pistons to maintain it in excess of the pressure of the drilling and inside the ram, by an amount equal or proportional to the difference between the mud pressures inside and outside the ram.

FIGURE 8 shows one example of a device for this purpose, which is housed in an enlarged part of the wall of the inner member 102 where it adjoins the turbine, and which comprises an orifice of variable area interposed in the return flow passage 146, and operated by a piston device responsive to the mud pressure differential between the inside and outside of the ram. The device comprises co-axial upper and lower cylinders 240 and 241, containing pistons 242 and 243 respectively, interconnected by a stem 244 which has an enlarged portion 245 at its upper end. This portion 245 constitutes a valve needle, controlling the area of an outlet orifice 246 from the lower chamber 247 of the upper cylinder. The chamber 247 is connected to the return flow passage 146, and the orifice 246 discharges into the upper chamber 249 of the cylinder 241, the chamber 249 being connected to a continuation 146a of the return flow passage, which discharges the oil into the gearbox 107 (FIGURE 4). The oil is pumped from the gearbox through a passage 124 by the pump 140, and delivered to the supply passage 123a. A flexible oil reservoir 125, subjected externally to the pressure in the mud flow passage 111, is connected to the passage 124. The upper chamber 248 of the cylinder 240 is connected by a passage 250 to the upper chamber 249 of the cylinder 241, while the lower chamber 252 of the lower cylinder 241 is vented by a passage 253, containing a filter screen 254, to the exterior of the ram.

Using the following notation:

$P_1$ = the mud flow pressure in the passage 111 and in the reservoir 125 (it is also substantially the pressure in the chambers 248 and 249 since the drop in pressure through the gearbox lubrication system is negligible), $P_2$ = the pressure in the conduit 146 and the chamber 247, $P_3$ = the borehole pressure externally of the ram, and the pressure in the chamber 252, $A_1$ = the area of the piston 242, and $A_2$ = the area of the piston 243.

Then, neglecting the small area of the stem 244, $$P_1A_1 + P_1A_2 = P_2A_1 + P_3A_2$$

whence $$P_2 - P_1 = \frac{A_2}{A_1}(P_1 - P_3)$$

In other words, the pressure $P_2$ acting on the underside of the bit-loading motive piston is maintained in excess of the pressure $P_1$ of the mud in the passage 111 by an amount proportional to the difference between $P_1$ and the pressure $P_3$ outside the ram, this latter pressure difference being responsible for the undesired extension force in the ram. By suitable choice of the area ratio $A_2/A_1$ in relation to the ratio of the total areas of the bit-loading motive pistons to the emergence area of the inner member 102, it is possible to counterbalance to any desired extent the extension force due to the different mud pressures inside and outside the ram.

For complete or nearly complete counterbalance, $A_2/A_1$ should equal $Ap/Ae$ where $Ap$ is the annulus area of the bit-loading piston (or pistons) and $Ae$ is the emergence area.

I claim:

1. A fluid pressure motive system comprising: a first conduit, a second conduit, a third conduit, a first orifice providing communication between the first and second conduits, and a second orifice providing communication between the second and third conduits; a motive cylinder, and a motive piston movable within the cylinder and dividing the interior of the cylinder into a first space and a second space; a first branch conduit connecting the second conduit to the first space, a second branch conduit connecting the third conduit to the second space; auxiliary cylinders, and linked auxiliary pistons movable within the auxiliary cylinders and dividing the interiors of the cylinders into at least a third space, a fourth space and a fifth space; a third branch conduit connecting the first conduit to the third space, a fourth branch conduit connecting the second conduit to the fourth space, and a fifth branch conduit connecting the third conduit to the fifth space; movable valve means for restricting the second orifice to a variable extent; and means linking the auxiliary pistons to the valve means to cause the valve means to reduce the area of the second orifice upon movement of the auxiliary pistons consequent on a change of the pressure in the second conduit towards equality with the pressure in the third conduit.

2. A fluid pressure motive system comprising first conduit means, second conduit means communicating with the first conduit means through a first orifice, and third conduit means communicating with the second conduit means through a second orifice; a motive piston having faces exposed respectively to the interiors of the second and third conduit means; auxiliary pressure-responsive means having faces exposed respectively to the interiors of the first, second, and third conduit means; movable valve means for restricting the second orifice to a variable extent; and means linking the auxiliary pressure-responsive means to the valve means to cause the valve means to reduce the area of the second orifice upon movement of the auxiliary pressure-responsive means consequent on a change of the pressure in the second conduit means towards equality with the pressure in the third conduit means.

3. A system according to claim 2 including a plug, the plug defining a bore which constitutes the first orifice, and means mounting the plug in a position to be accessible and removable from the system to permit exchange for another plug having a bore of different size.

4. A system according to claim 2 including means for opening the second orifice if the second orifice is in a closed condition as the motive piston approaches an end of its travel.

5. A system according to claim 2 in which said auxiliary pressure-responsive means is a differential piston.

6. A system according to claim 2 including a housing around the motive piston, a piston rod secured to the motive piston and emerging from the housing, the motive piston being subject to a higher pressure on its face away from the rod and a lower pressure on its face towards the rod, and means for controlling the said lower pressure to maintain the lower pressure proportional to the difference between the said higher pressure and the pressure prevailing outside the housing.

7. A system according to claim 2, wherein the face of the auxiliary pressure-responsive means exposed to the second conduit means is greater in area than either of the other two faces of the auxiliary pressure-responsive means.

8. A system according to claim 2 including a one-way release valve arranged to allow working fluid to pass from the normally lower-pressure side of the motive piston to the normally higher-pressure side.

9. A system according to claim 8 including means for opening the release valve if it is in a closed condition as the motive piston approaches the low-pressure end of its travel.

10. Borehole drilling equipment including a motor with an output shaft for connection to a rotary drill bit, a fitting for attachment to a drill string, and a hydraulic ram device interposed between the motor and the fitting for urging the motor and the fitting apart; the ram device including first conduit means, second conduit means communicating with the first conduit means through a first orifice, and third conduit means communicating with the second conduit means through a second orifice; a motive piston having faces exposed respectively to the interiors of the second and third conduit means; auxiliary pressure-responsive means having faces exposed respectively to the interiors of the first, second, and third conduit means, movable valve means for restricting the second orifice to a variable extent, and means linking the auxiliary pressure-responsive means to the valve means to cause the valve means to reduce the area of the second orifice upon movement of the auxiliary pressure-responsive means consequent on a change of the pressure in the second conduit means towards equality with the pressure in the third conduit means; a pump which supplies fluid to the conduit means, and a driving connection between the motor and the pump.

References Cited by the Examiner

UNITED STATES PATENTS

| | | | |
|---|---|---|---|
| 1,679,138 | 7/1928 | Osgood | 173—4 |
| 1,689,596 | 10/1928 | Osgood | 173—9 X |
| 1,923,595 | 8/1933 | Temple. | |
| 2,102,865 | 12/1937 | Vickers. | |
| 2,381,923 | 8/1945 | Obtresal | 91—417 X |
| 2,447,442 | 8/1948 | Tweedale et al. | 60—52 X |
| 2,644,482 | 7/1953 | McCallum | 137—504 X |
| 2,937,007 | 5/1960 | Whittle | 175—94 |
| 2,982,258 | 5/1961 | Farkas | 91—468 X |

CHARLES E. O'CONNELL, *Primary Examiner.*

I. A. CALVERT, J. A. LEPPINK, *Assistant Examiners.*